(12) United States Patent
Desjardins et al.

(10) Patent No.: US 10,519,871 B2
(45) Date of Patent: Dec. 31, 2019

(54) SUPPORT ASSEMBLY FOR A PROPELLER SHAFT

(71) Applicant: PRATT & WHITNEY CANADA CORP., Longueuil (CA)

(72) Inventors: Michel Desjardins, St-Hubert (CA); Jean Dubreuil, Boucherville (CA); Louis Brillon, Varennes (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 243 days.

(21) Appl. No.: 15/598,770

(22) Filed: May 18, 2017

(65) Prior Publication Data

US 2018/0334964 A1  Nov. 22, 2018

(51) Int. Cl.
 *F01D 25/16* (2006.01)
 *F02C 7/36* (2006.01)
 (Continued)

(52) U.S. Cl.
 CPC .............. *F02C 7/36* (2013.01); *F01D 25/162* (2013.01); *F02C 6/206* (2013.01); *F02C 7/06* (2013.01); *F05D 2220/323* (2013.01); *F05D 2220/324* (2013.01); *F05D 2220/329* (2013.01); *F05D 2260/30* (2013.01); *F05D 2260/40311* (2013.01)

(58) Field of Classification Search
 CPC ........ F02C 7/36; F02C 7/06; F05D 2220/323; F05D 2220/329; F05D 2260/40311; B64C 11/00
 See application file for complete search history.

(56) References Cited

U.S. PATENT DOCUMENTS

| 1,417,797 A | 5/1922 | Cook et al. |
| 5,152,668 A | 10/1992 | Bulman et al. |

(Continued)

FOREIGN PATENT DOCUMENTS

| CA | 2562290 C | 10/2005 |
| EP | 2535544 A2 | 12/2012 |

(Continued)

OTHER PUBLICATIONS

A New Approach to Turboshaft Engine Growth, M. A. Compagnon, General Electric Company, Lynn,Massachusetts pp. 80-41-1 to 80-41-6, May 13, 1980.

*Primary Examiner* — Richard A Edgar
(74) *Attorney, Agent, or Firm* — Norton Rose Fulbright Canada LLP

(57) ABSTRACT

A turbo propeller engine comprises a housing circumferentially extending around a longitudinal axis and disposed around a gearbox. The turbo propeller engine includes a propeller outside of the housing and a shaft surrounded in part by the housing and extending along the longitudinal axis. The shaft has a front end and a rear end. The propeller is mounted to the front end. The rear end is in a driven engagement with an output of the gearbox. The shaft is rotatably supported by a first bearing and by a second bearing separated from the first bearing by an axial distance along the longitudinal axis. The first and second bearings are disposed on opposite sides of the gearbox. The first bearing is disposed between the shaft and the housing, the second bearing is disposed between the housing and a component of the gearbox to rotatingly support the component of the gearbox.

20 Claims, 6 Drawing Sheets

(51) Int. Cl.
　　　*F02C 7/06*　　　(2006.01)
　　　*F02C 6/20*　　　(2006.01)

(56) References Cited

U.S. PATENT DOCUMENTS

| | | |
|---|---|---|
| 5,154,372 A | 10/1992 | Hora et al. |
| 5,310,391 A | 5/1994 | Takahashi |
| 6,364,805 B1 | 4/2002 | Stegherr |
| 6,735,954 B2 | 5/2004 | Macfarlane |
| 7,055,303 B2 | 6/2006 | MacFarlane |
| 7,104,918 B2 | 9/2006 | Mitrovic |
| 7,144,349 B2 * | 12/2006 | Mitrovic ................ B64D 35/00 475/331 |
| 7,223,197 B2 | 5/2007 | Poulin |
| 7,364,526 B2 | 4/2008 | Cho |
| 8,986,146 B2 | 3/2015 | Gallet |
| 9,145,834 B2 | 9/2015 | Frost et al. |
| 9,500,126 B2 | 11/2016 | Schwarz et al. |
| 9,752,500 B2 | 9/2017 | Ullyott |
| 9,890,704 B2 | 2/2018 | Speak et al. |
| 2012/0317991 A1 | 12/2012 | Frost et al. |
| 2016/0010562 A1 | 1/2016 | Sheridan |
| 2016/0032827 A1 | 2/2016 | Sheridan et al. |
| 2016/0040601 A1 | 2/2016 | Frost et al. |
| 2016/0230843 A1 | 8/2016 | Duong |
| 2016/0333786 A1 | 11/2016 | Glynn et al. |

FOREIGN PATENT DOCUMENTS

| | | |
|---|---|---|
| EP | 3135882 A1 | 3/2017 |
| GB | 2351121 A | 12/2000 |
| WO | 2017198999 A1 | 11/2017 |

* cited by examiner

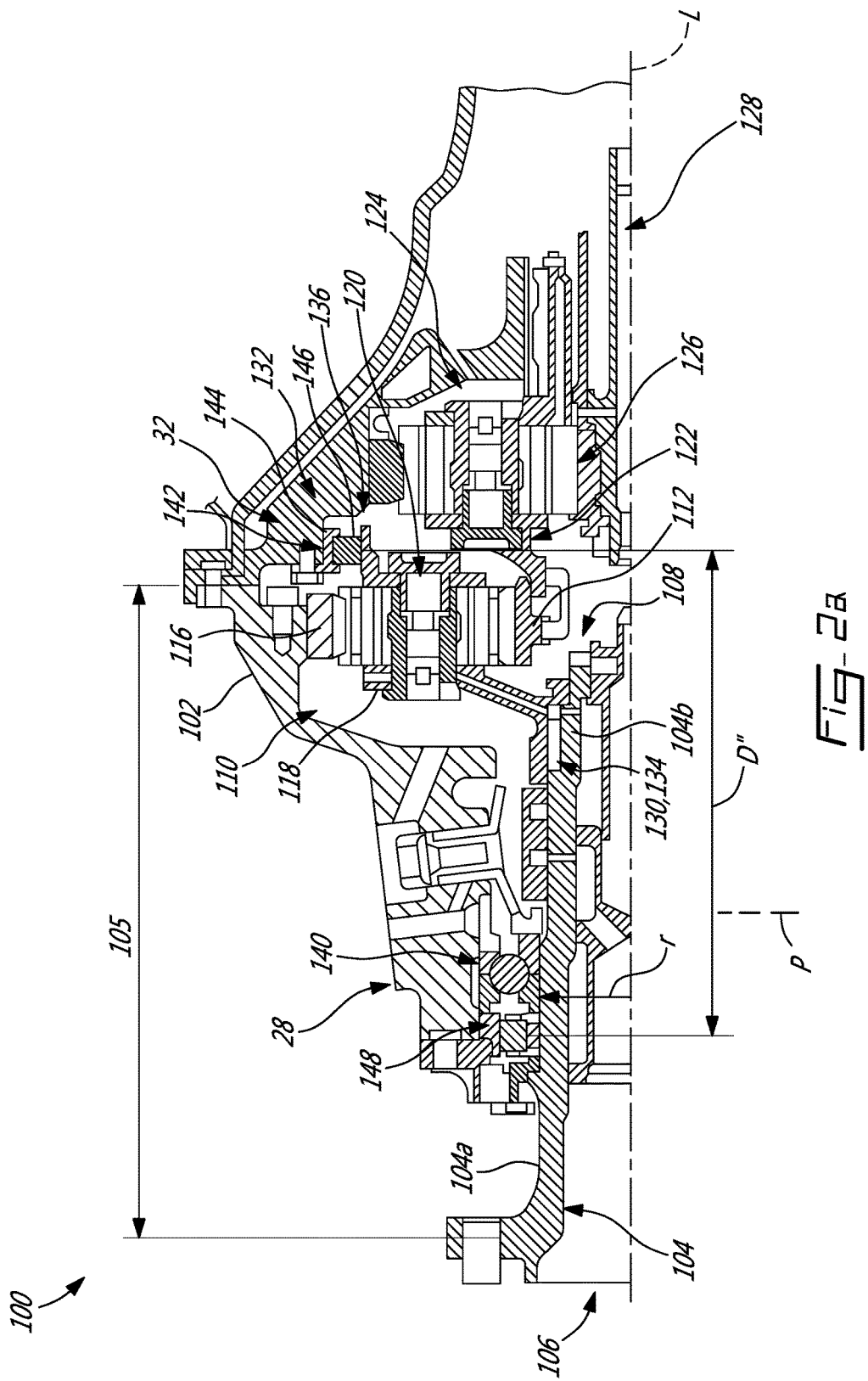

SUPPORT ASSEMBLY FOR A PROPELLER SHAFT

TECHNICAL FIELD

The application generally relates to turbo propeller engines, and, more particularly, to a support assembly to support a propeller shaft of such engines, and related method.

BACKGROUND OF THE ART

A propeller of a turbo propeller gas turbine engine is mounted on a shaft supported by bearings to allow rotation of the shaft relative to its longitudinal axis and to transfer the torque from the engine to the propeller. The shaft is coupled to the propeller at one end and is drivingly engaged by a gearbox at an opposite end. The bearings are spaced apart from one another along an axial length relative to the shaft longitudinal axis. The axial length is referred to as a bearing span. The greater is the bearing span, the smaller are the loads transmitted from the propeller to the housing supporting the shaft.

However, increasing the bearing span usually results in an increase of an overall length of the gas turbine engine. Engine performances are directly impacted by the overall length and as such it is a design objective to reduce the overall length of the gas turbine engine. Therefore, the gain associated with an increase of the bearing span may be overshadowed by the performance loss imputed to the increase in engine overall length.

SUMMARY

There is provided a turbo propeller engine comprising a housing circumferentially extending around a longitudinal axis and disposed around a gearbox, the turbo propeller engine further including a propeller outside of the housing, a shaft surrounded in part by the housing and extending along the longitudinal axis, the shaft having a front end and a rear end, the propeller being mounted to the front end of the shaft, the rear end in a driven engagement with an output of the gearbox, the shaft rotatably supported at least by a first bearing and by a second bearing separated from the first bearing by an axial distance along the longitudinal axis, the first and second bearings disposed on opposite sides of the gearbox, the first bearing disposed between the shaft and the housing, the second bearing disposed between the housing and a component of the gearbox to rotatingly support the component of the gearbox.

There is further provided an assembly for a turbo propeller engine, the assembly comprising: a housing circumferentially extending around a longitudinal axis; a propeller positioned outside of the housing; a shaft extending along the longitudinal axis between a front end and a rear end, the front end connected to the propeller, the shaft surrounded in part by the housing; a planetary gear train surrounded by the housing, the planetary gear train having a sun gear, planet gears in a driven engagement with the sun gear, at least one ring gear in a driven engagement with the planet gears, and a planet carrier rotatably supporting the planet gears, the sun gear configured to receive a torque from a turbine section of the turbo propeller engine, the at least one ring gear affixed to an inner side of the housing, the planet carrier in a driven engagement with the rear end of the shaft; a first bearing proximate the front end of the shaft and disposed between the shaft and the housing; and a second bearing spaced from the first bearing by an axial distance along the longitudinal axis, the second bearing disposed between the housing and the planet carrier, the first and second bearings disposed on opposite sides of the gearbox.

There is yet further provided a method for supporting a load applied by a propeller to a shaft of a turbo propeller engine, the shaft coupled at one end to the propeller and at an opposite end to a gearbox, the method comprising: supporting the shaft at a first location, forward of the gearbox, and at a second location, rearward of the gearbox; driving the propeller to propel the turbo propeller engine by creating an airflow around a housing that is an external envelope of the turbo propeller engine, the driving causing the load at the first location and at the second location; counteracting a radial component of the load by applying radial reaction forces on both sides of the gearbox, at the first and second locations; and counteracting an axial component of the load by applying an axial reaction force at the first location, forward of the gearbox and/or at the second location, rearward of the gearbox.

DESCRIPTION OF THE DRAWINGS

Reference is now made to the accompanying figures in which:

FIG. 2a is a schematic cross-sectional view of a front section of the gas turbine engine of FIG. 1 in accordance with one embodiment;

FIG. 2b is a schematic cross-sectional view of a gearbox contained in the front section of FIG. 2a;

FIG. 3b is a schematic cross-sectional view of a gearbox contained in the front section of FIG. 3a.

DETAILED DESCRIPTION

Figure 1:
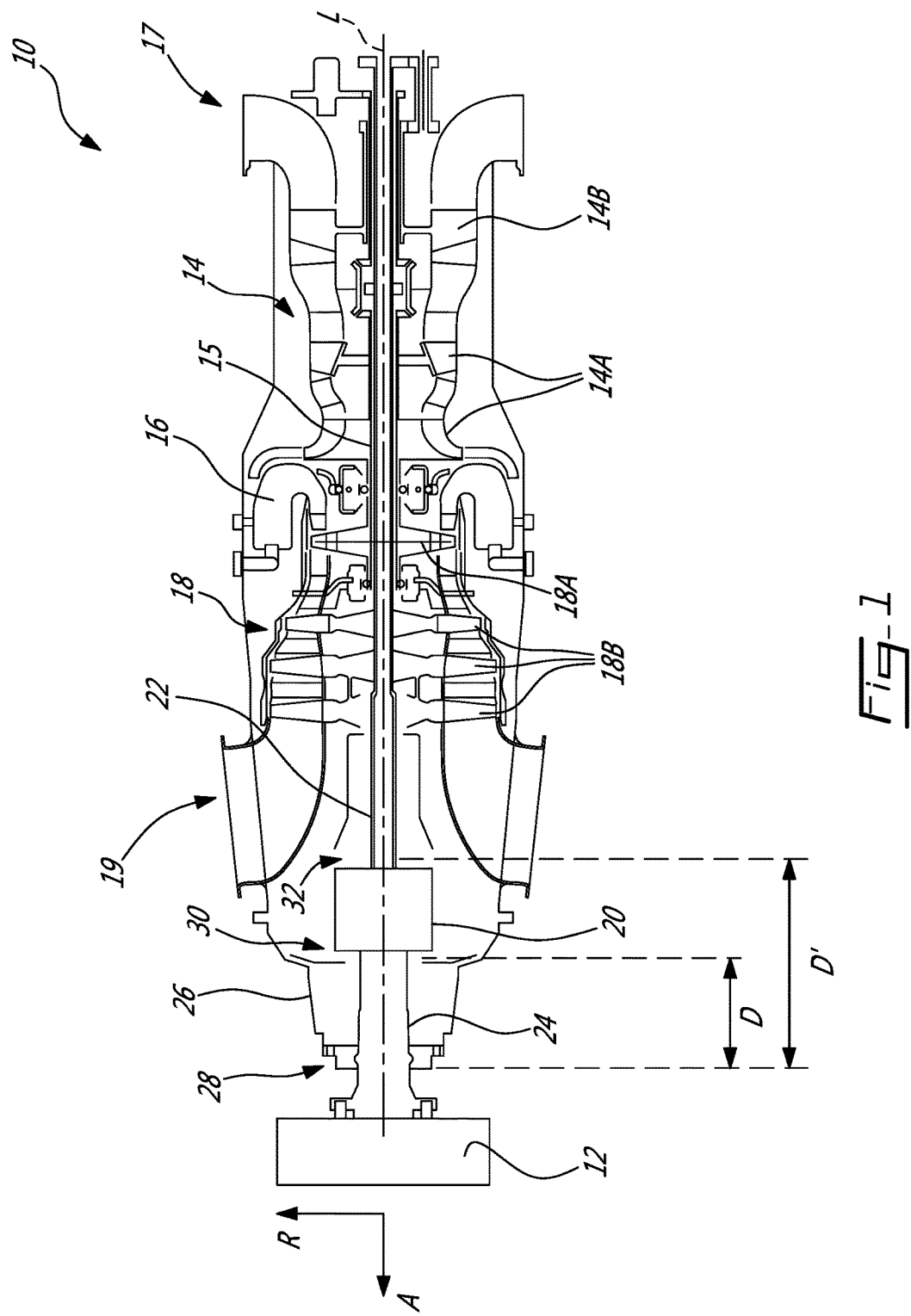
FIG. 1 is a schematic cross-sectional view of a gas turbine engine.

FIG. 1 illustrates a gas turbine engine 10 of a type preferably provided for use in subsonic flight and configured for driving a rotating component 12, such as, but not limited to, a propeller or a helicopter rotor. Depending on the intended use, the engine 10 may be any suitable aircraft engine, and may be configured as a turbo propeller engine or a turboshaft engine. The gas turbine engine 10 generally comprises in serial flow communication a compressor section 14 for pressurizing the air, a combustor 16 in which the compressed air is mixed with fuel and ignited for generating an annular stream of hot combustion gases, and a turbine section 18 for extracting energy from the combustion gases.

The exemplary embodiment shown in FIG. 1 is a "reverse-flow" engine because gases flow from the inlet 17, at a rear portion of the engine 10, to the exhaust outlet 19, at a front portion of the engine 10. This is in contrast to "through-flow" gas turbine engines in which gases flow through the core of the engine from a front portion to a rear portion. The engine 10 may be a reverse-flow engine (as illustrated) or a through-flow engine.

In the illustrated embodiment, the turbine section 18 has a high-pressure turbine 18a in a driven engagement with a high-pressure compressor 14a. The high-pressure turbine 18a and the high-pressure compressor 14a are mounted on a high-pressure shaft 15. The turbine 18 has a low-pressure turbine, also known as power turbine 18*b*, configured to drive the rotating component 12. The power turbine 18*b* is configured to drive a low-pressure compressor 14*b* through a low-pressure shaft 22. A reduction gearbox 20 is configured to connect the low-pressure shaft 22 that supports the power turbine 18*b* to a shaft 24 that drivingly engages the rotating component 12, while providing a reduction speed ratio therebetween.

The reduction gearbox 20 allows the rotating component 12 to be driven at a given speed, which is different than the rotational speed of the low-pressure turbine 18*b*. The reduction gearbox 20 allows both the rotating component 12 and the low-pressure turbine 18*b* to rotate at their respective optimal speeds which are different. In the embodiment shown, the reduction gearbox 20 is axially mounted at the front end of the engine 10 and is disposed within a housing 26 that circumferentially extends around a longitudinal axis L. The housing 26 is an external envelope of the turbo propeller engine 10. Accordingly, the rotation of the rotating component or propeller 12 creates an airflow around the housing 26 to create thrust. The housing 26 is thus wetted by air of an environment of the engine 10, i.e., ambient air. In a particular embodiment, the propeller 12 comprises from two to eight blades equidistantly separated from one another. The length of each blade of the propeller 12 may be substantially greater than a greatest radius of the housing 26—for example, at least double the size.

The shaft 24 is used to support the rotating component 12, which generates a load on the shaft 24. The load has a radial component R and an axial component A relative to the axis L. The radial and axial components R and A of the load are the consequence of the creation of thrust by the rotation of the rotating component 12. To limit radial and axial displacements of the shaft 24 relative to the engine housing 26, the shaft 24 is supported at two locations 28 and 30 axially spaced apart from one another relative to the axis L and disposed adjacent to the ends of the shaft 24. A distance between the first and second locations 28 and 30 is referred to herein below as a bearing span D. It may be desired to increase the bearing span D, to reduce the loads transferred from the rotating component 12 to the engine housing 26. However, an overall length of the engine 10 is a key dimension for engine specification and is maintained small to increase engine performance. In FIG. 1, the bearing span D is representative of prior art arrangements, with the aft bearing at 30 being positioned fore of the reduction gearbox 20.

In the embodiments shown, the bearing span D is increased by shifting the second support location 30 on an opposite side of the gearbox 20 such that the gearbox 20 is located between the previous second location 30 and a proposed second location 32, such that the shaft 20 is supported solely at the locations 28 and 32, and not at location 30. This allows an increase in the bearing span from D to D' without increasing the overall engine length. More details regarding the embodiments of FIGS. 2*a* and 3*a* are presented herein below.

Figure 2B:
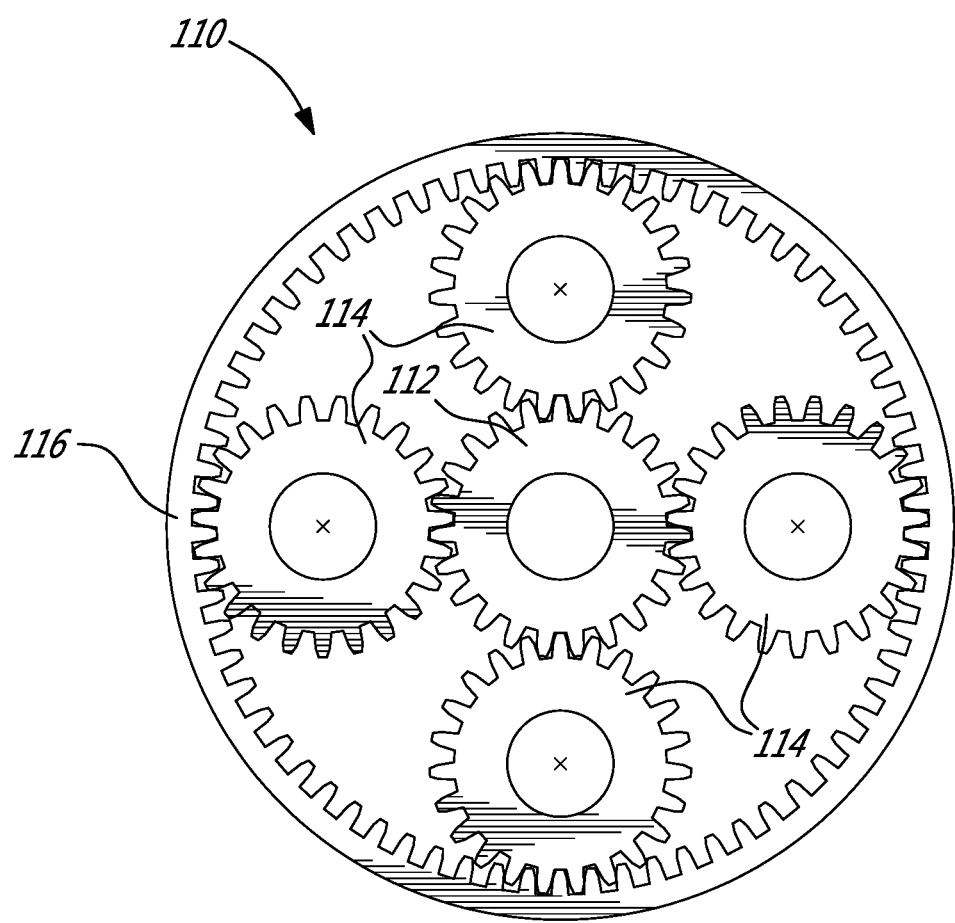
Figure 3A:
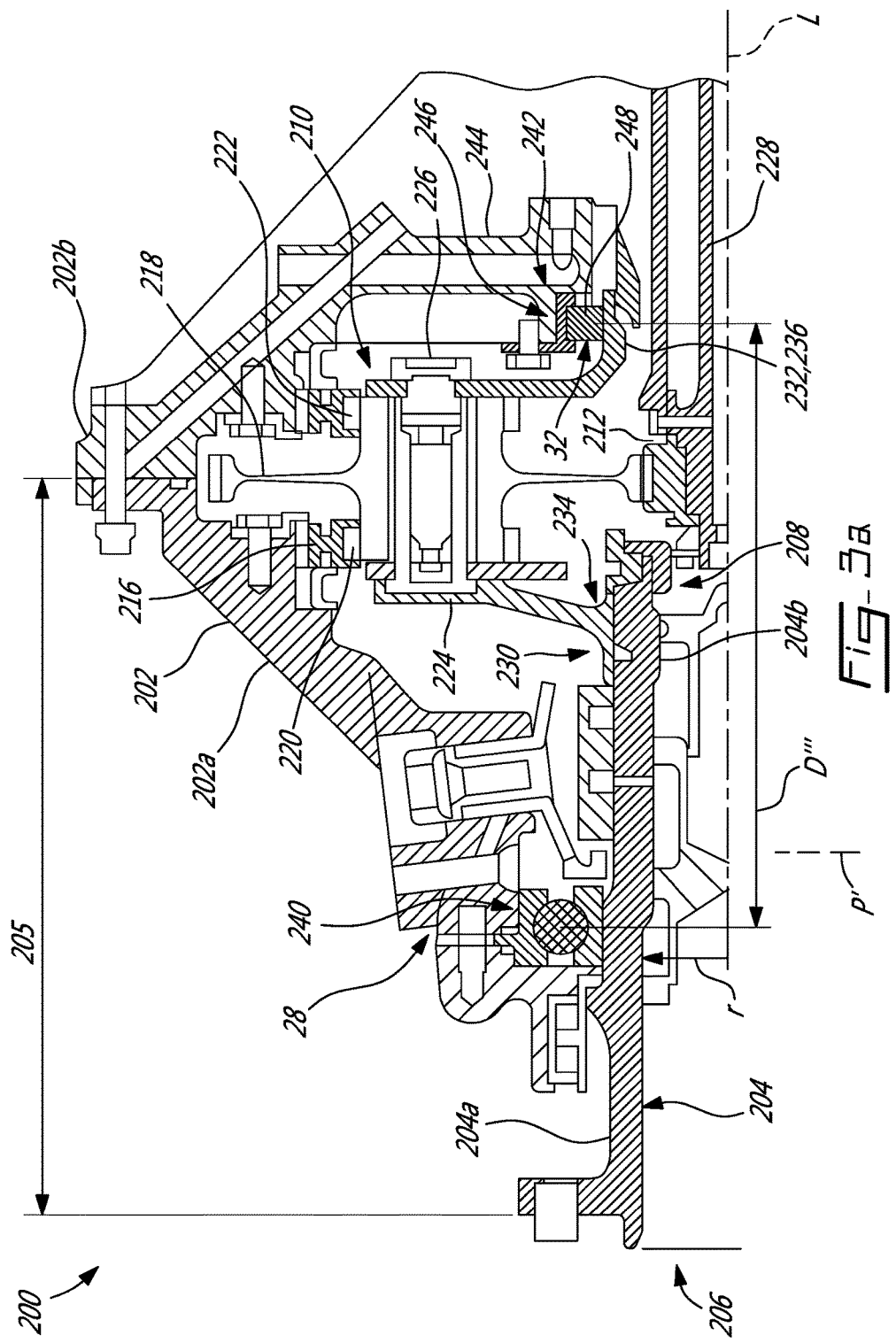
FIG. 3a is a schematic cross-sectional view of a front section of the gas turbine engine of FIG. 1 in accordance with another embodiment.

Referring now to FIGS. 2*a* and 2*b*, an assembly 100 in accordance with one embodiment is illustrated. The assembly 100, configured to be disposed at a fore portion of the engine 10, comprises a housing 102 and a shaft 104 extending along the longitudinal axis L between a front end 106 and a rear end 108. The front end 106 drivingly engages the rotating component, not shown for simplicity of the figure. The assembly 100 further includes a gearbox 110 that drivingly engages the shaft rear end 108. The housing 102 is configured to be disposed around the gearbox 110 and a portion of the shaft 104. The assembly of shaft 104 and gearbox 110 has a length 105 extending along the axis L from the shaft front end 106 and a rear end of the gearbox 110.

In the illustrated embodiment, the gearbox 110 is a planetary gear train having a sun gear 112, planet gears 114 disposed around the sun gear 112 and meshed therewith, and a ring gear 116 disposed around the planet gears 114 and meshed therewith. A diameter of the sun gear 112 may be different than a diameter of the planet gears 114 to create a rotational speed ratio between the sun gear 112 and the planet gears 114. The gearbox 110 further includes a planet carrier 118 rotatably supporting the planet gears 114, the planet carrier being coupled to the shaft 104. Bearings are disposed between shafts 120 of the planet carrier 118 and the planet gears 114 for allowing rotation of the planet gears 114 on the shafts 120, with one of the shafts 120 visible in FIG. 2*a*. In the embodiment shown, the ring gear 116 is mounted to the housing 102 and is substantially immobile relative to the housing 102. A compliant flexure (not shown) may be disposed between the housing 102 and the ring gear 116 to allow at least small temporary radial and axial excursions and rotational excursions transverse to the axis L.

In the illustrated embodiment, the sun gear 112 receives the torque from the power turbine 18*b* via an output 122 of another planetary gear train 124. The other planetary gear train 124 may have the same configuration as the planetary gear train 110 described herein and the output 122 connected to the sun gear 112 may be a planet carrier of the other planetary gear train 124. The other planetary gear train may be required to obtain the desired rotational speed ratio between the shaft 104 and the low-pressure shaft 22. The other planetary gear train 124 has an input 126 in a driven engagement with a lay-shaft 128 that receives torque from the low-pressure shaft 22. In a particular embodiment, the other planetary gear train 124 is not required and the gearbox sun gear 112 is in a direct driven engagement with the lay-shaft 128 or with the low-pressure shaft 22. In a particular embodiment, the sun gear 112 is in a direct driven engagement with the low-pressure shaft 22.

Still referring to FIGS. 2*a* and 2*b*, the planet carrier 118 extends along the longitudinal axis L between a fore end 130 and an aft end 132. The fore end 130 drivingly engages the shaft rear end 108. For that purpose, the planet carrier 118 includes a connector 134 configured to receive the shaft rear end 108. For example, the connector 134 and the shaft rear end 108 are in splined coupling. A compliant flexure (not shown) may be disposed between the planet carrier connector 134 and the shaft rear end 108.

The aft end 132 of the planet carrier 118 has an axial protrusion 136 that defines a cylindrical surface oriented radially outwardly relative to the longitudinal axis L. The axial protrusion 136 extends axially aft of the shaft rear end 108 along the longitudinal axis L. In a particular embodiment, the axial protrusion 136 defines two spaced-apart ribs. The function of the axial protrusion 136 is described herein below.

As previously mentioned, the shaft 104 is supported by supports disposed at two locations respectively forward and rearward of the gearbox 110. The supports are bearing 140, 142, and 148 that limit axial and radial movements of the shaft 104 relative to the axis L, but allow circumferential movement (i.e. rotation) about the axis L. The axial A and radial R components (see FIG. 1) of the load created by the rotating component 12 are counteracted by the first, second, and third bearings 140, 142, and 148. Hence, the assembly 100 has the first and third bearings 140, 148 disposed at the first location 28 proximate the shaft front end 106. The first and third bearings 140, 148 extend radially between the shaft 104 and the housing 102, and are supported by the housing 102 which serves as structure for the shaft 104. The second bearing 142 is disposed at the second location 32 between the housing 102 and the planet carrier aft end 132. The first and third bearings 140, 148 are disposed on opposite sides of the gearbox 110 relative to the second bearing 142. The second and third bearings 142, 148 are spaced apart from one another by an axial distance, namely bearing span D". The shaft 104 has a mid-plane P separating a fore section 104a and an aft section 104b of the shaft 104, the mid-plane P located midway along the length of the shaft 104. The fore section 104a is supported by the first bearing 140 whereas the aft section 104b may be solely supported by the planet carrier connector 134, and hence by the second bearing 142 via the gearbox 110.

The bearing span D" therefore extends axially aft of the shaft rear end 108. In the illustrated embodiment, a ratio of the bearing span D" over a radius r of the shaft 104 at the first location 28 where the first or third bearing 140, 148 meets the shaft 104 is equal to or greater than about 1.5. In the depicted embodiment, the second bearing 142 has a diameter greater than a diameter of the first bearing 140. The greater diameter of the second bearing 142 may offer a better distribution of the load. In this embodiment, for an equal length 105, the bearing span D' is substantially greater with the illustrated location 32 of the second bearing 142, in comparison to having the aft bearing located at prior location 30, i.e., between the housing 102 and the planet carrier connector 134, forward of the gearbox 110. Hence, in the illustrated embodiment, by having the aft bearing 142 at the illustrated location 32 instead of at the prior location 30, the load transferred from the rotating component 12 to the housing 102 is reduced without having to increase the engine overall length. The second bearing 142 extends radially between the planet carrier aft end 132 and the housing 102. More specifically, the housing may have a rail 144 affixed thereto. In a particular embodiment, the rail 144 is integrally formed within the housing 102. The rail 144 defines a cylindrical surface oriented to face radially inwardly relative to the longitudinal axis L. The rail 144 may further include spaced-apart ribs extending radially inwardly from the cylindrical surface of the rail 144. The second bearing 142 may comprise rolling elements 146 disposed between the rail 144 and the planet carrier aft end axial protrusion 136. The axial position of the rolling elements 146 relative to the longitudinal axis L is maintained with the spaced-apart ribs (see FIG. 3c). The load supported by the shaft 104 is transmitted from the shaft rear end 108 to the planet carrier aft end 132 through the planet carrier 118 and the planet carrier shafts 120. The load is then transferred from the planet carrier aft end 132 to the housing 102 via the second bearing 142. Stated differently, the shaft rear end 108 is supported by the cooperation between the planetary gear train 110, the bearing 142 and the housing 102.

In the illustrated embodiment, the first bearing 140 is a ball bearing, or thrust bearing, configured to maintain an axial position of the shaft 24 relative to the housing 102. The second bearing 142 is a roller bearing configured to maintain a radial position of the shaft 24 relative to the housing 102. Accordingly, the rolling elements 146 of the second bearing 142 are cylindrical rollers. The ball bearing 140 may be a tapered roller bearing such that the rolling elements, instead of being spherical, have a frustoconical shape, or may employ a cup and a cone as outer ring and inner ring, respectively. In a particular embodiment, the location of the ball and roller bearings may be inverted such that the roller bearing is proximate the shaft front end 106 and the ball bearing is disposed between the planet carrier aft end 132 and the housing 102. The third bearing 148 is a roller bearing configured to support a portion of the radial component R of the load. The radial component R of the load is divided between the second and third bearings 142 and 148. In the embodiment shown, the axial component A of the load is counteracted only at the first location 28 or at the second location 32 to avoid stress due to thermal dilatation of the components (e.g., shaft 104) of the assembly 100. In the embodiment shown, the axial component A is counteracted by the first bearing 140 at the first location 28 forward of the gearbox 110

Figure 3B:
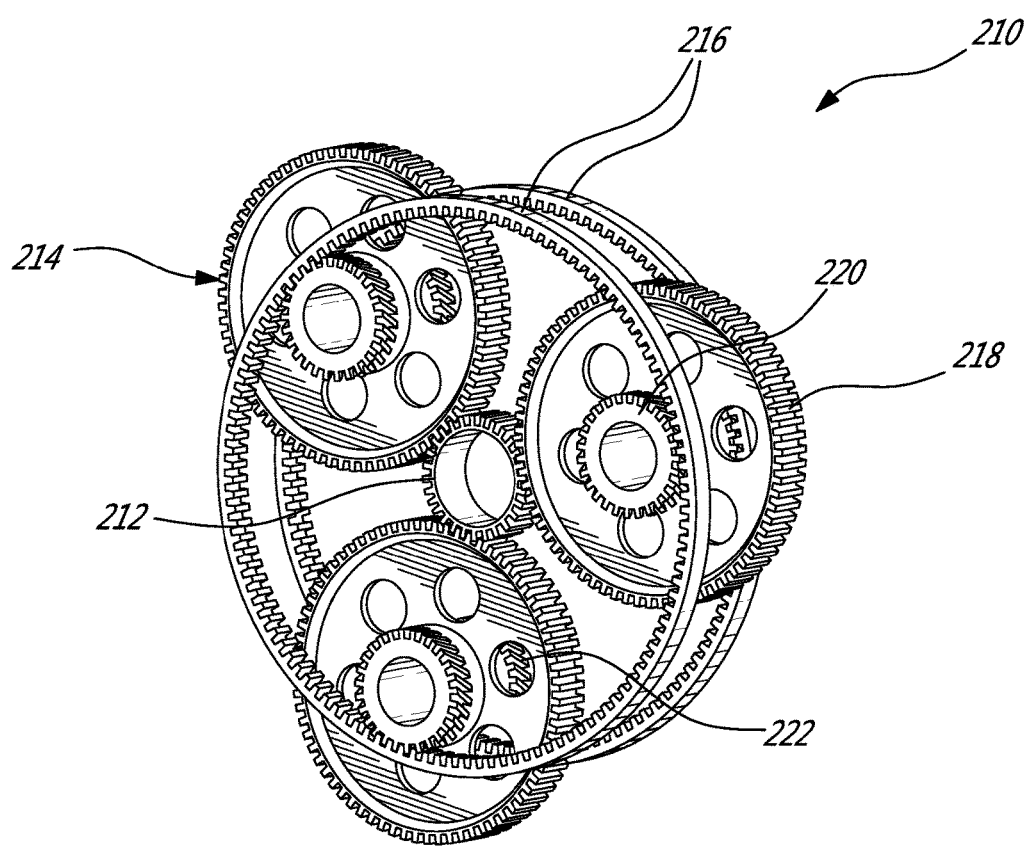

Referring now to FIGS. 3a and 3b, an assembly 200 in accordance with another embodiment is illustrated. The assembly 200 comprises a housing 202 and a shaft 204 extending along the longitudinal axis L between a front end 206 and a rear end 208. The front end 206 drivingly engages the rotating component 12, not shown for simplicity of the figure. The assembly 200 further includes a gearbox 210 that drivingly engages the shaft 204. The housing 202 is configured to be disposed around the gearbox 210 and a portion of the shaft 204. The housing 202 may have a first section 202a and a second section 202b. The assembly of the shaft 204 and gearbox 210 has a length 205 extending along the axis L from the shaft front end 206 and a middle plane of the gearbox 210, corresponding to a rear end of the first section 202a of the housing 202. Both sections 202a and 202b of the housing 202 extend contiguously along the longitudinal axis L and are affixed with each other using fasteners.

In the illustrated embodiment, the gearbox 210 is a planetary gearbox 210 and has a sun gear 212 and planet gears 214. The planet gears 214 are in a driven engagement with the sun gear 212. The gearbox 210 further includes at least one ring gear 216 in a driven engagement with the planet gears 214. In the illustrated embodiment, as visible from FIG. 3b, the planet gears 214 include main, or primary gears 218, and secondary, or fore lateral gears 220. Each of the secondary gears 220 is disposed adjacent, and rotates with, a respective one of the primary gears 218. In the illustrated embodiment, the gearbox further includes aft lateral gears 222 with a dedicated ring gear 216, such that the gearbox includes two ring gears 216.

The fore and aft lateral gears 220 and 222 are disposed on opposite sides of the primary gears 218 and rotate therewith. The primary gears 218 are meshed with the sun gear 212 and the fore and aft lateral gears 220 and 222 are meshed with a respective one of the two ring gears 216. In the embodiment shown, the ring gears 216 are affixed to the housing 202 and are substantially immobile relative to the housing 202. More specifically, one of the ring gears 216 is affixed to the housing first section 202a and the other one of the ring gears 216 is affixed to the housing second section 202b. A compliant flexure (not shown) may be disposed between the housing 202 and the ring gears 216 to allow at least small temporary radial and axial excursions and rotational excursions transverse to the axis L. The gearbox 210 further includes a planet carrier 224 rotatably supporting the planet gears 214. Bearings are disposed between shafts 226 of the planet carrier 224 and the planet gears 214 for allowing rotation therebetween. The two ring gears 216 share the distribution of the torque on opposite sides of a plane defined by the primary gears 218. In the embodiment shown, the torque is distributed substantially equally between the housing first and second sections 202a and 202b.

In the depicted embodiment, a diameter of the sun gear 212 is smaller than the diameter of the primary gears 218 to create a first rotational speed ratio. A diameter of the primary gears 218 is greater than a diameter of the secondary gears 220, 222 to create a second rotational speed ratio.

The sun gear 212 is configured to receive a torque, or rotational input, from the low-pressure shaft 22 of the power turbine 18b. In the illustrated embodiment, the sun gear 212 receives the torque from the power turbine 18b via a lay-shaft 228 that is in a driven engagement with the low-pressure shaft 22. Alternatively, the sun gear 212 may be coupled directly to the low-pressure shaft 22.

Still referring to FIGS. 3a and 3b, the planet carrier 224 extends along the longitudinal axis L between a fore end 230 and an aft end 232. The fore end 230 drivingly engages the shaft rear end 208. For that purpose, the planet carrier 224 includes a connector 234 configured to receive the shaft rear end 208. For example, the connector 234 and the shaft rear end 208 are in splined coupling. A compliant flexure may be disposed between the planet carrier fore end 230 and the shaft rear end 208.

The aft end 232 of the planet carrier 224 has an axial protrusion 236 that defines a cylindrical surface oriented radially outwardly relative to the longitudinal axis L. The axial protrusion 236 extends in an aft direction relative to the shaft rear end 208 along the longitudinal axis L. The axial protrusion 236 may have spaced-apart ribs extending radially outwardly from the cylindrical surface. The function of the axial protrusion 236 is described herein below.

As previously mentioned, the shaft 204 is supported by supports disposed at two locations respectively forward and rearward of the gearbox 210. The supports are bearing 240 and 242 that limit axial and radial movements of the shaft 204 relative to the axis L, but allow circumferential movement (i.e. rotation) about the axis L. The axial A and radial R components (see FIG. 1) of the load created by the rotating component 12 are counteracted at least by the first and second bearings 240, 242. Hence, the assembly 200 further has the first bearing 240 disposed at the first location 28 proximate the shaft front end 206. The first bearing 240 extends radially between the shaft 204 and the housing first section 202a, and is supported by the housing 202 which serves as structure for the shaft 204. The second bearing 242 is disposed at the second location 32 between the housing 202 and the planet carrier aft end 232. The first and second bearings 240 and 242 are disposed on opposite sides of the gearbox 210 and are spaced apart from one another by an axial distance, namely bearing span D". The shaft 204 has a mid-plane P' separating a fore section 204a and an aft section 204b of the shaft 204. The fore section 204a is supported by the first bearing 240 whereas the aft section 204b is solely supported by the planet carrier connector 234, and hence by the second bearing 242 via the gearbox 210.

The bearing span D''' therefore extends axially aft of the shaft rear end 208. In the illustrated embodiment, a ratio of the bearing span D''' over a radius r of the shaft 204 at the first location 28 where the shaft 204 meets the first bearing 240 is equal to or greater than about 2. In this embodiment, for an equal length 205, the bearing span is greater with the illustrated location 32 of the second bearing 242, in comparison to having the aft bearing located at prior location 30, i.e., between the housing 202 and the planet carrier connector 234, forward of the gearbox 210. Hence, in the illustrated embodiment, by having the aft bearing 242 at the illustrated location 32 instead of at the prior location 30, the load transferred from the rotating component 12 to the housing 202 is reduced without having to increase the engine overall length.

The second bearing 242 extends radially between the planet carrier aft end 232 and the housing 204. More specifically, the housing second section 202b has a radial protrusion 244 extending radially inwardly relative from an inner side of the housing 202. The housing second section 202b may have a rail 246 affixed to the radial protrusion 244. In a particular embodiment, the rail 246 is integrally formed within the housing 202. The rail 246 defines a cylindrical surface oriented to face radially inwardly relative to the longitudinal axis L. The rail 246 may further include spaced-apart ribs extending radially inwardly from the cylindrical surface of the rail 246. The second bearing 242 may comprise rolling elements 248 disposed between the rail 246 and the planet carrier aft end axial protrusion 236. The axial position of the rolling elements 248 relative to the longitudinal axis is maintained with the spaced-apart ribs. The load supported by the shaft 204 is transmitted from the shaft rear end 208 to the planet carrier aft end 232 through the planet carrier 224 and the planet carrier shafts 226. The load is then transferred from the planet carrier aft end 232 to the housing second section 202b via the second bearing 242. Stated differently, the shaft rear end 208 is supported by the cooperation between the planetary gear train 210, the bearing 242, and the housing 202.

In the illustrated embodiment, the first bearing 240 is a ball bearing, or thrust bearing, configured to maintain both a radial and an axial position of the shaft 24 relative to the housing 202. The second bearing 242 is a roller bearing configured to maintain a radial position of the shaft 204 relative to the housing 202. Accordingly, the rolling elements 248 of the second bearing 242 are cylindrical rollers. The ball bearing 240 may be a tapered roller bearing such that the rolling elements, instead of having a spherical shape, have a frustoconical shape, or may employ a cup and a cone as outer ring and inner ring, respectively. In a particular embodiment, the location of the ball and roller bearings may be inverted such that the roller bearing is proximate the shaft front end 206 and the ball bearing is disposed between the planet carrier aft end 232 and the housing 202. The first bearing 240 may be substituted by a combination of a ball bearing and a roller bearing as illustrated in FIG. 2a. The axial component A of the load is counteracted at the first location 28 by the bearing 240. The radial component R of the load is counteracted at both the first and second locations and divided between the first and second bearings 240, 242. In the embodiment shown, the axial component A of the load is counteracted only at the first location 28 or at the second location 32 to avoid stress due to thermal dilatation of the components (e.g., shaft 204) of the assembly 200.

Figure 3C:
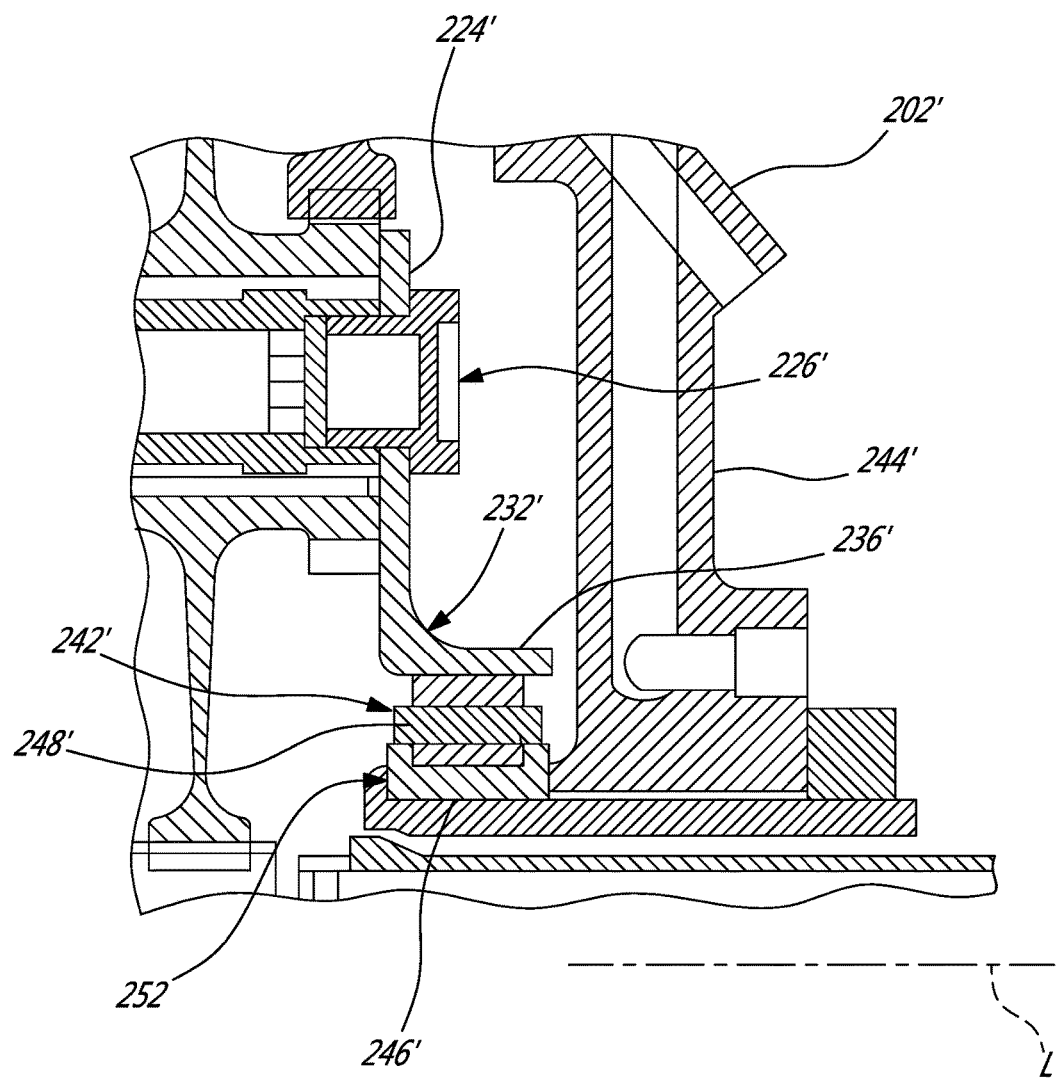
FIG. 3c is a schematic cross-sectional view of a portion of the front section of FIG. 3a in accordance with yet another embodiment.

Referring also to FIG. 3c, an alternate embodiment of the second bearing arrangement is illustrated. In this alternate embodiment, the aft end 232' of the planet carrier 224' has an axial protrusion 236' that defines a cylindrical surface oriented to face radially inwardly relative to the axis L. The housing 202' has a rail 246' affixed to a radial protrusion 244' extending radially inwardly from the housing inner side. The rail 246' defines a cylindrical surface oriented to face radially outwardly relative to the axis L. The rail further includes spaced-apart ribs 252 extending radially outwardly from the cylindrical surface of the rail 246'. The second bearing 242' therefore comprises the rolling elements 248' disposed between the rail 246' and the axial protrusion 236' at the aft end of the planer carrier 224'. The axial position of the rolling elements 248' relative to the longitudinal axis L is maintained with the spaced-apart ribs 252. The load supported by the shaft is transmitted from the shaft rear end 208 to the planet carrier aft end 232' through the planet carrier 224' and the planet carrier shafts 226'. The load is then transferred from the planet carrier aft end 232' to the housing 202' via the second bearing 242'. Stated differently, the shaft rear end 208 is supported by the cooperation between the planetary gear train 210, the bearing 242', and the housing 202'.

Referring to FIGS. 1, 2a, and 2b, for supporting the load applied to the shaft 104 of the engine 10 by the rotating component 12, the shaft 104 is supported at a first location 28, by the first and third bearings 140, 148 disposed forward of the gearbox 110, and at a second location 32, by the second bearing 142 disposed rearward of the gearbox 110. The bearing span D" corresponds to at least 1.5 times a radius r of the shaft 104 at the first location 28. It is understood that the first and third bearings 140, 148 may be substituted by a single thrust bearing as illustrated in FIG. 3a.

The radial component R of the load is counteracted by applying radial reaction forces on both sides of the gearbox 110 at the first 28 and second 32 locations, by the second and third bearings 142, 148, respectively. The first, second, and third bearings 140, 142, and 148 allow rotation of the shaft 104 relative along the longitudinal axis L.

The axial component A of the load is counteracted by applying an axial reaction force at the first location 28, forward of the gearbox 110, by the first bearing 140. The radial component R of the load is transmitted from the shaft rear end 108 to the housing 102 at the second location 32, via the gearbox 110. The load is therefore transmitted from the first, second, and third bearings to the housing 102 of the engine 10.

Supporting the shaft 104 at the second location 32 comprises transferring a portion of the load from the opposite end 108 of the shaft 104 to the housing 102 via a component of the gearbox 110. In the illustrated embodiment, the component of the gearbox is the planet carrier 118.

Although the method of supporting the load has been described with respect to the embodiment depicted in FIGS. 2a-2b, it is understood that the load is supported similarly by the embodiments depicted in FIGS. 3a-3c. In the embodiment illustrated in FIGS. 3a-3c, the axial component A of the load is counteracted at the first location 28 by the first bearing 240. The radial component R of the load is counteracted at both the first and second locations 28, 32 by the first and second bearings 240, 242.

Still referring to all figures, a method for supporting the load applied by the rotating component 12 (e.g., propeller) to the shaft 104, 204 of a turbo propeller engine 10 is disclosed. The shaft 104, 204 is coupled at one end to the propeller and at an opposite end to a gearbox 110, 210. The method comprises supporting the shaft 104, 204 at the first location 28, forward of the gearbox 110, 210, and at the second location 32, rearward of the gearbox 110, 210. The method further comprises driving the propeller 12 to propel the turbo propeller engine 10 by creating an airflow around a housing 102, 202 that is an external envelope of the turbo propeller engine 10. The driving of the rotating component 12 causes the load at the first location 28 and at the second location 30.

The method further comprises counteracting the radial component R of the load by applying radial reaction forces on both sides of the gearbox 110, 210, at the first and second locations 28, 32, and counteracting an axial component A of the load by applying an axial reaction force at the first location 28, forward of the gearbox 110, 210, and/or at the second location 32, rearward of the gearbox 110, 210.

The method further comprises transmitting the axial and radial components A, R of the load from the shaft opposite end 108, 208 to the second location 32 via the gearbox 110, 210.

The step of counteracting the load comprises counteracting the load at the first location 28 and at the second location 32 axially spaced apart from the first location 28 by an axial distance D", D''' of at least 1.5 times a radius r of the shaft 104, 204 at the first location 28.

The step of supporting the shaft 104, 204 at the second location 32 comprises transferring a portion of the load from the opposite end 108, 208 of the shaft 104, 204 to the housing 102, 202 via a component of the gearbox 110, 210. In the embodiment shown, the component of the gearbox is the planet carrier 118, 224.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A turbo propeller engine comprising a housing circumferentially extending around a longitudinal axis and disposed around a gearbox, the turbo propeller engine further including a propeller outside of the housing, a shaft surrounded in part by the housing and extending along the longitudinal axis, the shaft having a front end and a rear end, the propeller being mounted to the front end of the shaft, the rear end in a driven engagement with an output of the gearbox, the shaft rotatably supported at least by a first bearing and by a second bearing separated from the first bearing by an axial distance along the longitudinal axis, the first and second bearings disposed on opposite sides of the gearbox, the first bearing disposed between the shaft and the housing, the second bearing disposed between the housing and a component of the gearbox to rotatibly support the component of the gearbox.

2. The turbo propeller engine according to claim 1, wherein a ratio of the axial distance over a radius of the shaft equal to or greater than 1.5.

3. The turbo propeller engine according to claim 1, wherein the gearbox is a planetary gear train having:
   a sun gear configured to receive a torque generated by a turbine section of the turbo propeller engine;
   planet gears in a driven engagement with the sun gear;
   at least one ring gear affixed to an inner side of the housing and in a driven engagement with the planet gears; and
   a planet carrier rotatably supporting the planet gears, the planet carrier being in a driven engagement with the rear end of the shaft, wherein the component is the planet carrier.

4. The turbo propeller engine according to claim 3, wherein the planet gears include primary gears meshed with the sun gear and secondary gears meshed with a respective one of the at least one ring gear, each of the secondary gears disposed adjacent, and rotating with, a respective one of the primary gears, a diameter of the primary gears greater than a diameter of the secondary gears.

5. The turbo propeller engine according to claim 3, wherein the planet carrier extends along the longitudinal axis between a fore end and an aft end, the fore end configured to engage the shaft.

6. The turbo propeller engine according to claim 5, wherein the second bearing is defined by rolling elements disposed between a rail of the housing and an axial protrusion of the aft end of the planet carrier.

7. The turbo propeller engine according to claim 1, wherein a diameter of the second bearing is greater than a diameter of the first bearing.

8. The turbo propeller engine according to claim 1, wherein the first bearing is a ball bearing and wherein the second bearing is a roller bearing.

9. The turbo propeller engine according to claim 1, further comprising a third bearing disposed adjacent the first bearing, the third bearing being a roller bearing.

10. An assembly for a turbo propeller engine, the assembly comprising:
    a housing circumferentially extending around a longitudinal axis;
    a propeller positioned outside of the housing;
    a shaft extending along the longitudinal axis between a front end and a rear end, the front end connected to the propeller, the shaft surrounded in part by the housing;
    a planetary gear train surrounded by the housing, the planetary gear train having a sun gear, planet gears in a driven engagement with the sun gear, at least one ring gear in a driven engagement with the planet gears, and a planet carrier rotatably supporting the planet gears, the sun gear configured to receive a torque from a turbine section of the turbo propeller engine, the at least one ring gear affixed to an inner side of the housing, the planet carrier in a driven engagement with the rear end of the shaft;
    a first bearing proximate the front end of the shaft and disposed between the shaft and the housing; and
    a second bearing spaced from the first bearing by an axial distance along the longitudinal axis, the second bearing disposed between the housing and the planet carrier, the first and second bearings disposed on opposite sides of the gearbox.

11. The assembly according to claim 10, wherein a ratio of the axial distance over a radius of the shaft equal to or greater than 1.5.

12. The assembly according to claim 10, wherein the planet gears include primary gears meshed with the sun gear and secondary gears meshed with the at least one ring gear, each of the secondary gears disposed adjacent, and rotating with, a respective one of the primary gears, a diameter of the primary gears greater than a diameter of the secondary gears.

13. The assembly according to claim 10, wherein the planet carrier extends along the longitudinal axis between a fore end and an aft end, the fore end configured to engage the shaft.

14. The turbo propeller engine according to claim 10, wherein the second bearing is defined by rolling elements disposed between a rail of the housing and an axial protrusion of an aft end of the planet carrier.

15. The assembly according to claim 10, wherein a diameter of the second bearing is greater than a diameter of the first bearing.

16. The assembly according to claim 10, wherein the first bearing is a ball bearing and wherein the second bearing is a roller bearing.

17. A method for supporting a load applied by a propeller to a shaft of a turbo propeller engine, the shaft coupled at one end to the propeller and at an opposite end to a gearbox, the method comprising:
    supporting the shaft at a first location, forward of the gearbox, and at a second location, rearward of the gearbox, the shaft supported at the second location via a component of the gearbox;
    driving the propeller to propel the turbo propeller engine by creating an airflow around a housing that is an external envelope of the turbo propeller engine, the driving causing the load at the first location and at the second location;
    counteracting a radial component of the load by applying radial reaction forces on both sides of the gearbox, at the first and second locations; and
    counteracting an axial component of the load by applying an axial reaction force at the first location, forward of the gearbox, and/or at the second location, rearward of the gearbox.

18. The method according to claim 17, further comprising transmitting the axial and radial components of the load from the opposite end of the shaft to the second location via the gearbox.

19. The method according to claim 17, wherein counteracting the load comprises counteracting the load at the first location and at the second location axially spaced apart from the first location by an axial distance of at least 1.5 times a radius of the shaft at the first location.

20. The method of claim 17, wherein supporting the shaft at the second location comprises transferring a portion of the load from the opposite end of the shaft to the housing via the component of the gearbox.

* * * * *